(12) United States Patent
Fujio (10) Patent No.: US 11,046,521 B2
(45) Date of Patent: Jun. 29, 2021

(54) CURVED CONVEYOR

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 17/076,223

(22) Filed: Oct. 21, 2020

(65) Prior Publication Data

US 2021/0032038 A1    Feb. 4, 2021

Related U.S. Application Data

(63) Continuation of application No. PCT/JP2019/015154, filed on Apr. 5, 2019.

(30) Foreign Application Priority Data

May 18, 2018   (JP) .............................. JP2018-095860

(51) Int. Cl.
*B65G 13/08* (2006.01)
*B65G 13/06* (2006.01)
*B65G 21/16* (2006.01)
*B65G 13/07* (2006.01)

(52) U.S. Cl.
CPC ............. *B65G 13/08* (2013.01); *B65G 13/06* (2013.01); *B65G 13/07* (2013.01); *B65G 21/16* (2013.01)

(58) Field of Classification Search
CPC ........ B65G 13/08; B65G 13/06; B65G 21/16; B65G 39/02; B65G 2812/99; B65G 13/10; B65G 15/02; B65G 13/07

USPC .......................................... 198/787, 623–624
See application file for complete search history.

(56) References Cited

U.S. PATENT DOCUMENTS

| | | | | |
|---|---|---|---|---|
| 1,428,234 A | * | 9/1922 | Huebsch ................ | B65G 13/08 198/707 |
| 2,309,723 A | * | 2/1943 | Wilson ................... | B65G 13/08 193/35 C |
| 2,759,585 A | * | 8/1956 | Timmons ............... | B65G 13/10 193/36 |
| 3,026,993 A | * | 3/1962 | Penn ...................... | B65G 13/08 198/787 |
| 3,170,562 A | * | 2/1965 | Eyster ................... | B65G 13/071 198/787 |
| 3,275,124 A | * | 9/1966 | Lutes ..................... | B65G 13/08 198/787 |

(Continued)

FOREIGN PATENT DOCUMENTS

| | | | | |
|---|---|---|---|---|
| EP | 0356268 A1 | * | 2/1990 | ............. B65G 13/07 |
| FR | 2800720 A1 | * | 5/2001 | ............. B65G 13/08 |
| JP | S6012406 A |   | 1/1985 | |

*Primary Examiner* — Mark A Deuble
(74) *Attorney, Agent, or Firm* — St. Onge Steward Johnston & Reens LLC (57) ABSTRACT

A curved conveyor in a horizontal curved path section of a conveying path has an inner idler wheel array arranged to the inside of the horizontal curved path section with respect to an arc-shaped center line that passes through the center of the path width of the horizontal curved path section, and an outer driving wheel array arranged to the outside of the horizontal curved path section with respect to the arc-shaped center line, wherein the distance from the arc-shaped center line to the outer driving wheel array is smaller than the distance from the arc-shaped center line to the inner idler wheel array.

7 Claims, 4 Drawing Sheets

(56) References Cited

U.S. PATENT DOCUMENTS

| | | | | |
|---|---|---|---|---|
| 3,826,351 A | * | 7/1974 | Fromme | B65G 13/07 198/787 |
| 4,179,026 A | * | 12/1979 | de Vries | B65G 15/02 198/831 |
| 4,479,572 A | * | 10/1984 | Merz | B65G 13/02 198/345.3 |
| 7,441,648 B1 | * | 10/2008 | Kitazumi | B65G 15/02 198/465.3 |
| 2007/0193859 A1 | * | 8/2007 | Kyutoku | H01L 21/6773 198/787 |

* cited by examiner

CURVED CONVEYOR

TECHNICAL FIELD OF THE INVENTION

The present invention relates to a curved conveyor installed at a horizontal curved path section in a conveying path for conveying a conveyed object having a constant width.

BACKGROUND OF THE INVENTION

As a curved conveyor of this kind, as described in Japanese Published Unexamined Patent Application No. S60-12406 (Patent Literature 1), a curved conveyor is known that conical drive rollers are radially arranged at circumferentially regular intervals such that an extension of the axial center of the drive roller passes through the arc center of the horizontal curved path section and a small-diameter end is oriented so as to be located on the arc center side. The configuration using the conical drive rollers is intended to make the conveyed object travel along the horizontal curved path section at the same speed as the traveling speed at a straight path section by making the moving speed of an outer side (an outer side when a side closer to the arc center is defined as an inner side) of the conveyed object entering the horizontal curved path section from the straight path section faster than the conveying speed of the conveyed object at the straight path section and making the moving speed of the inner side of the conveyed object slower such that the traveling speed at the center position of the width of the conveyed object traveling the horizontal curved path section becomes the same as the traveling speed at the straight path section. Therefore, it is logically conceivable that the conveyed object can be made to travel along the horizontal curved path section in the same manner as the above even if driving wheels driving at the circumferential speed equivalent to that of large-diameter end portions of the conical drive rollers are arranged at appropriate intervals along the horizontal curved path section at positions corresponding to the large-diameter end portions of the conical drive rollers and the inner-side side of the conveyed object is supported by idler wheels.

SUMMARY OF THE INVENTION

However, even in the configuration using the driving wheels, similar to the conical drive rollers, there is a difference at a position near the outer side of the conveyed object between the conveying speed of the conveyed object at the straight path section and the circumferential speed of the driving wheel. Therefore, in a transfer process in which the conveyed object travels straddling the straight path section and the horizontal curved path section at an entrance and an exit of both ends of the horizontal curved path section, slip occurs between the driving wheel or a conveyance means of the straight path section and the conveyed object, which leads to wear of the driving wheel and the conveyance means of the straight path section or the conveyed object. In addition, the behavior of the conveyed object becomes unstable. Further, when the circumferential speed of the driving wheel located near the outer side of the conveyed object at the horizontal curved path section is made equivalent to the conveying speed of the conveyed object at the straight path section, the traveling speed of the conveyed object at the horizontal curved path section becomes slower than the traveling speed at the straight path section. Thus, the conveyance efficiency is reduced and the front-rear distance between conveyed objects traveling at the straight path section is narrowed at the horizontal curved path section, and, when the distance between the front and rear of the conveyed objects at the straight path section is small, such a disadvantage is caused that the front and rear conveyed objects push each other and the posture falls out of alignment and the conveyed objects are pressed against either of both inner and outer arc-shaped guides regulating the width of the horizontal curved path section and then stop.

The present invention proposes a curved conveyor capable of solving the conventional problem as described above. Described by giving reference signs in parentheses used in the description of an embodiment described below in order to facilitate understanding the relationship with the embodiment, the curved conveyor according to the present invention is a curved conveyor (1) installed at a horizontal curved path section (8) in a conveying path, including an inner idler wheel array (14) arranged along the horizontal curved path section (8) on an inner side, where an arc center is located, with respect to an arc-shaped center line (8a) passing through a center of a path width (L2) of the horizontal curved path section (8) and an outer driving wheel array (13) arranged along the horizontal curved path section (8) on an outer side, which is opposite to the side where the arc center is located, with respect to the arc-shaped center line (8a), in which a distance (D1) from the arc-shaped center line (8a) to the outer driving wheel array (13) is configured to be shorter than a distance (D2) from the arc-shaped center line (8a) to the inner idler wheel array (14).

According to the configuration of the present invention described above, the traveling speed of the conveyed object at the straight path section connected to the horizontal curved path section and the circumferential speed of each driving wheel of the outer driving wheel array provided to the horizontal curved path section are set to the same level, and undesirable effects such as slip and wear and the unstable behavior of the conveyed object caused by the difference between the driving speeds with respect to the conveyed object in the transfer process of the conveyed object between the horizontal curved path section and the straight path section can be avoided. Further, since the position of the outer driving wheel array provided to the horizontal curved path section is made closer to the center side of the width of the conveyed object, the traveling speed of the conveyed object traveling along the horizontal curved path section is increased by the thrust received from the outer driving wheel array and the difference with the traveling speed of the conveyed object at the straight path section is reduced as compared with the case in which the position of the outer driving wheel array is located at a position supporting the outer side of the conveyed object. As a result, the distance between the front and rear conveyed objects traveling at the straight path section can be made narrower than the distance conventionally required for avoiding abnormal pushing at the horizontal curved path section, and the reduction in conveyance efficiency can be prevented.

When the foregoing present invention is implemented, the outer driving wheel array (13) can be composed of driven wheels (16) pivotally supported at appropriate intervals by an outer bearing means (18) provided along the horizontal curved path section (8), a driving wheel (17) interlockingly coupled to a driving motor (15), and a transmission means (21) interlockingly coupling the driven wheels (16) and the driving wheel (17) with one another, and the inner idler wheel array (14) can be composed of idler wheels (25)

pivotally supported at intervals wider than the wheel intervals of the outer driving wheel array (13) by an inner bearing means (26) provided along the horizontal curved path section (8), and both inner and outer side guides (40*a*, 40*b*) regulating a traveling path width of a conveyed object at the horizontal curved path section (8) can be provided bilaterally symmetrically with respect to the arc-shaped center line passing through the center of the path width of the horizontal curved path section (8). More specifically, the outer driving wheel array (13) can be composed of the driven wheels (16) pivotally supported, in a cantilever manner at appropriate intervals, by one side of an outer arc-shaped bearing plate (18) provided along the horizontal curved path section (8), the driving wheel (17) interlockingly coupled to the driving motor (15), and the transmission means (21) interlockingly coupling the driven wheels (16) and the driving wheel (17) with one another, and a strip cover (23) curved along the horizontal curved path section (8), having openings (24) for making upper circumferential surface portions of the driven wheels (16) and the driving wheel (17) upwardly project, and covering the transmission means (21) can be supported by the arc-shaped bearing plate (18), and the inner idler wheel array (14) can be composed of the idler wheels (25) pivotally supported, in a cantilever manner at intervals wider than the wheel intervals of the outer driving wheel array (13), by one side of an inner arc-shaped bearing plate (26) provided along the horizontal curved path section (8), and the both inner and outer side guides (40*a*, 40*b*) regulating the traveling path width of the conveyed object at the horizontal curved path section (8) can be respectively supported by the both inner and outer arc-shaped bearing plates (18, 26) via brackets (43*a* to 44*b*). According to this configuration, the curved conveyor of the present invention can be simply and inexpensively implemented with minimum necessary members.

When the curved conveyor of the present invention is configured as described above, the driving wheel (17) of the outer driving wheel array (13) can be attached to an output shaft of the driving motor (15) without being pivotally supported by the outer arc-shaped bearing plate (18). According to this configuration, when the driving wheel pivotally supported at a fixed position of the outer arc-shaped bearing plate is interlockingly coupled to the driving motor necessary to be installed on the frame, a transmission means using a belt or chain necessary also for absorbing variations in relative position between the both becomes unnecessary, and the structure can be simplified to be implemented inexpensively. Moreover, the driving wheel is interlockingly coupled to the driven wheels via the transmission means, and thus, even if there are some variations in installation position of the driving motor, the variations can be absorbed by the transmission means between the driving wheel and the driven wheels, and no disadvantage is caused.

The outer driving wheel array (13) and the inner idler wheel array (14) can be divided into a plurality of fan-shaped regions whose circumferential length is an integral fraction of 90 degrees (for example, 45 degrees or 30 degrees) and the motor (15) driving the wheels (16, 17) of the outer driving wheel array (13) in each of the fan-shaped regions can be installed at each fan-shaped region to form a plurality of arc-shaped conveyor units (12A to 12D) having the same structure. End portions of each arc-shaped conveyor unit (12A to 12D) can be provided with coupling members (27*a*, 27*b*) coupling the end portions of adjacent conveyor units. By connecting the plurality of arc-shaped conveyor units (12A to 12D) in the circumferential direction via the coupling members (27*a*, 27*b*), the curved conveyor (1) having a required circumferential length (required angle range) can be formed. The curved conveyor generally has a length corresponding to a horizontal curved path section of 90 degrees or 180 degrees. However, according to the foregoing configuration, by simply coupling a plurality of arc-shaped conveyor units having a circumferential length of, for example, 45 degrees or 30 degrees, with one another in the arc shape via the coupling members, a curved conveyor having a required conveying path length (conveying angle range) can be formed without adding driving force transmission means between adjacent arc-shaped conveyor units.

Further, linear conveyor units (10, 11) each including a linear outer driving wheel array (28) and a linear inner idler wheel array (29) connected to the outer driving wheel array (13) and the inner idler wheel array (14) can be arranged between the horizontal curved path section (8) and straight path sections (2, 3) connected to the horizontal curved path section (8), and wheels (31) of the outer driving wheel arrays (28) of the linear conveyor units (10, 11) can be interlockingly coupled to the wheels (16) of the outer driving wheel array (13) of the connected horizontal curved path section (8) side. According to this configuration, the influence on the posture received by which the conveyed object entering the horizontal curved path section from the straight path section directly transfers onto the outer driving wheel array located closer to the center line of the horizontal curved path section and the influence on the posture received by which the conveyed object leaving the horizontal curved path section for the straight path section directly transfers onto the existing straight path section from on top of the driving wheel array located closer to the center line of the horizontal path section can also be mitigated, and smooth and effortless transfer of the conveyed object between the horizontal curved path section and the straight path sections can be realized.

The conveyed object traveling the horizontal curved path section has an inner longitudinal center portion slidingly contacting the arc-shaped inner side guide and has corner portions of both outer longitudinal ends slidingly contacting the arc-shaped outer side guide, and the position (posture) is determined. In order to position the driving wheel array of the horizontal curved path section as close as possible to the center line of the conveyed object, it is considered to be desirable that the inner side guide is not extended to the outside (the side where the arc center is located) and only the outer side guide is extended largely to the outside (the side opposite to the side where the arc center is located). However, when both inner and outer side guides are installed this way, the number of idler wheels of the idler wheel array supporting the inner-side side of the conveyed object is significantly reduced, and a problem arises that the load acting on each idler wheel becomes too large. In order to solve the problem, it is desirable that the both inner and outer side guides (40*a*, 40*b*) are bilaterally symmetrically extended with respect to the arc-shaped center line (8*a*) so as to be wider than a path width of straight path sections (2, 3) connected to the horizontal curved path section (8). The conveyed object traveling the horizontal curved path section receives a large force in a direction of jumping outward by inertia. Thus, in order to reduce the outward pressing force of the conveyed object acting upon the arc-shaped outer side guide and make the conveyed object effortlessly and smoothly travel between the both inner and outer side guides, it is conceived to devise that each wheel forming the outer driving wheel array is pivotally supported at a slight angle in an orientation in which the front end side is displaced to the arc center side with respect to a virtual arc line passing through the center point of each wheel of the outer driving wheel array in plan view.

DETAILED DESCRIPTION OF THE INVENTION

Figure 1:
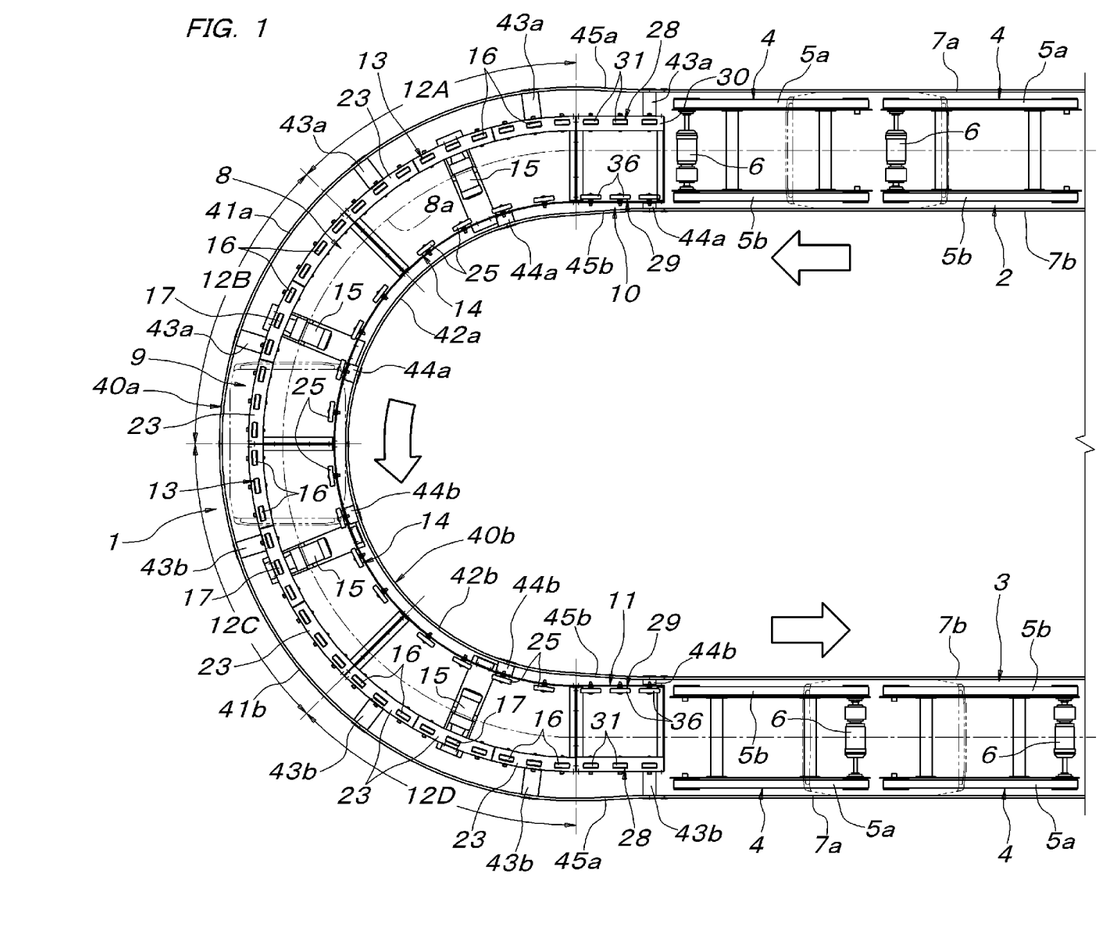
FIG. 1 is a plan view showing a state in which two parallel straight path sections are connected by a curved conveyor according to one embodiment of the present invention.

In FIG. 1, reference sign 1 denotes a curved conveyor according to the present invention, which connects an upstream side straight path section 2 and a downstream side straight path section 3 parallel to each other. Both the straight path sections 2, 3 are formed by connecting linear belt conveyor units 4 having a fixed length. Each linear belt conveyor unit 4 is formed of two conveyor belts 5a, 5b arranged in parallel and one driving motor 6 arranged at a downstream side end portion in the conveying direction so as to be able to synchronously drive both the conveyor belts 5a, 5b. A pair of left and right linear side guides 7a, 7b regulating the traveling path width of a tray T as a conveyed object are juxtaposed to each straight path section 2, 3.

The curved conveyor 1 is composed of a main body 9 having a horizontal curved path section 8 having an arc-shaped path length of 180 degrees, an upstream side linear conveyor unit 10 connecting a terminal end of the upstream side straight path section 2 and a beginning end of the horizontal curved path section 8, and a downstream side linear conveyor unit 11 connecting a terminal end of the horizontal curved path section 8 and a beginning end of the downstream side straight path section 3. The main body 9 of the curved conveyor 1 is composed of four arc-shaped conveyor units 12A to 12D each divided into a fan-shaped region having a circumferential length of 45 degrees.

Figure 2:
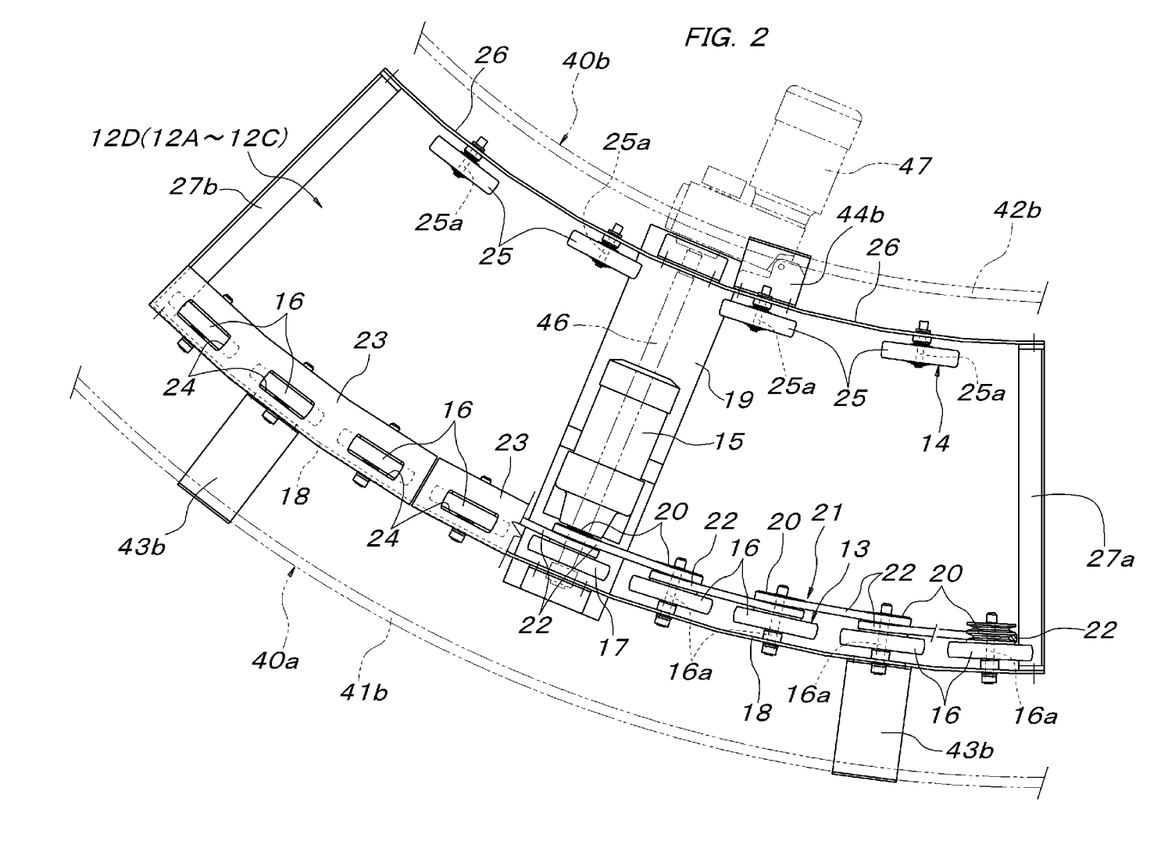
FIG. 2 is an enlarged partially cutaway plan view showing one of arc-shaped conveyor units forming the curved conveyor shown in FIG. 1.

Each of the arc-shaped conveyor units 12A to 12D has the same structure, and as shown in FIG. 2, includes an outer driving wheel array 13 and an inner idler wheel array 14 having an arc shape concentric with an arc-shaped center line 8a in the horizontal curved path section 8, that is, the arc-shaped center line 8a connecting center lines of conveying paths of the upstream side linear conveyor unit 10 and the downstream side linear conveyor unit 11 (center lines passing through center positions of the widths between the linear side guides 7a, 7b) and a driving motor 15 for driving wheels of the outer driving wheel array 13. The distance between the outer driving wheel array 13 and the arc-shaped center line 8a is narrower than the distance between the arc-shaped center line 8a and the inner idler wheel array 14.

The outer driving wheel array 13 is formed of a plurality of driven wheels 16 arranged at circumferentially regular intervals and one driving wheel 17. The driving wheel 17 is arranged at the center of the outer driving wheel array 13. Other driven wheels 16 are supported in a cantilever manner via support shafts 16a so as to be located inside an outer arc-shaped bearing plate 18 serving as an outer bearing means concentric with the horizontal curved path section 8 at circumferentially regular intervals including the driving wheel 17. The central driving wheel 17 is not pivotally supported by the outer arc-shaped bearing plate 18 and is directly connected to an output shaft of the driving motor 15 installed on a frame 19. The support shafts 16a of respective driven wheels 16 and the output shaft of the driving motor 15 to which the driving wheel 17 is directly connected are arranged radially with respect to the arc center of the arc-shaped center line 8a.

Each of the driven wheels 16 and the one driving wheel 17 have the same structure. As shown by a driven wheel 16 shown at the most downstream side end portion in the conveying direction in FIG. 2, a double pulley 20 is concentrically and integrally attached to every wheel 16, 17 at the side opposite to the side where the outer arc-shaped bearing plate 18 is located. Thus, a transmission means 21 interlockingly coupling all of the driven wheels 16 to the driving wheel 17 directly connected to the driving motor 15 is composed of the double pulleys 20 provided to all of the wheels 16, 17 and endless belts 22 stretched, in an inside and outside alternating manner, between the double pulleys 20 of adjacent wheels including the driving wheel 17.

Figure 4:
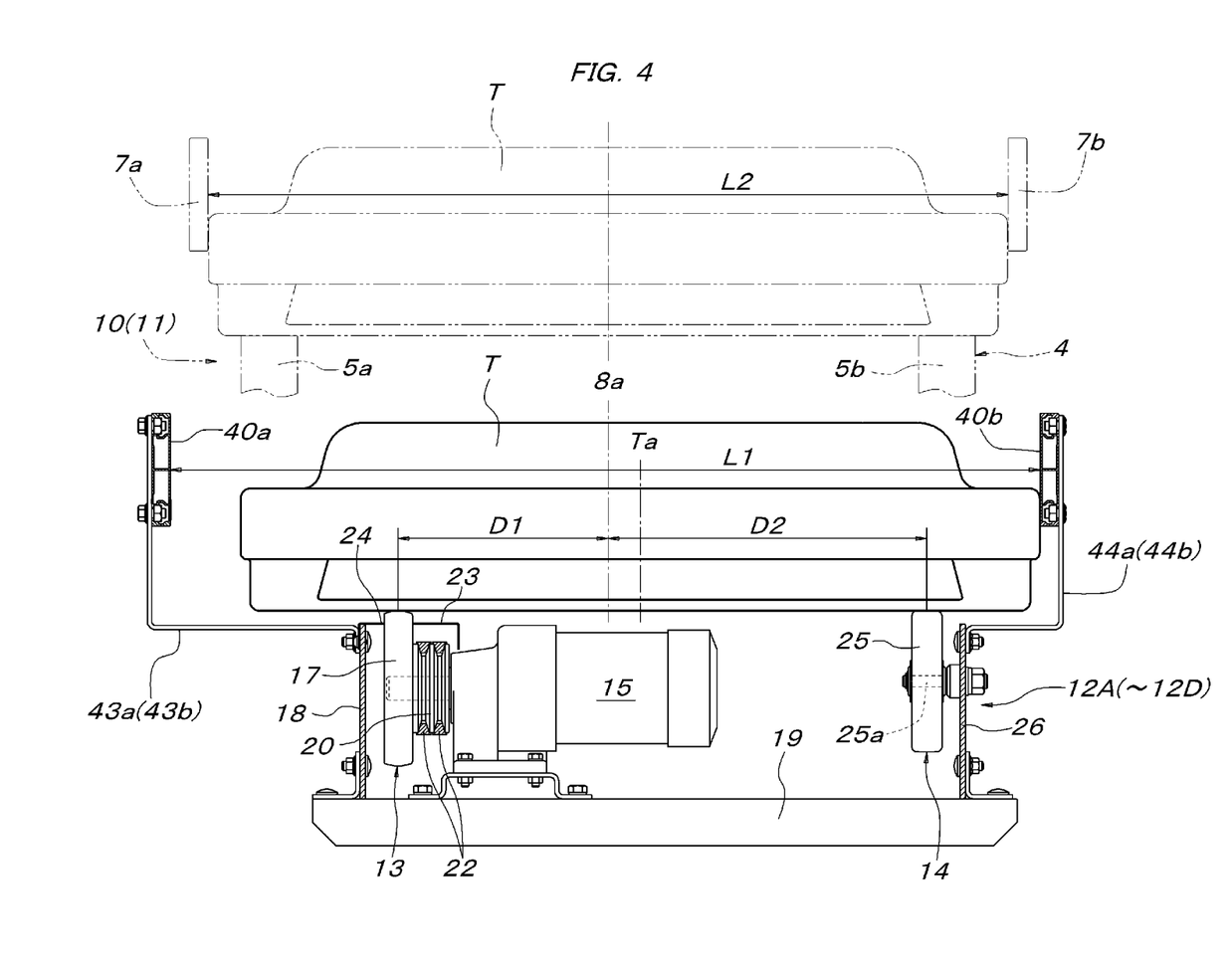
FIG. 4 is an enlarged cross-sectional front view of the curved conveyor of FIG. 1.

Further, a strip cover 23 curved along the horizontal curved path section 8 is juxtaposed to the outer driving wheel array 13, as partially shown in FIG. 2. As shown in FIG. 4, the strip cover 23 has a portal cross-sectional shape with both inner and outer sides of the arc shape provided with downwardly bent arc-shaped side wall portions, and at the arc-shaped side wall portion on the outer side, the strip cover 23 is attached to an upper end portion of the outer arc-shaped bearing plate 18. The strip cover 23 protrudes to the upper side of the outer driving wheel array 13 from the outer arc-shaped bearing plate 18 in a cantilever manner, is provided with rectangular openings 24 for making upper circumferential surface portions of each driven wheel 16 and the driving wheel 17 upwardly project, and covers the entire transmission means 21 including the double pulleys 20 of the respective wheels 16, 17. The strip cover 23 may continue over the entire area of 45 degrees in each arc-shaped conveyor unit 12A to 12D. However, in the illustrated example, the arc-shaped length in the direction along the arc-shaped center line 8a is divided into one third.

The inner idler wheel array 14 includes a plurality of idler wheels 25 arranged at circumferentially regular intervals along the arc-shaped center line 8a. Each idler wheel 25 is supported in a cantilever manner via a support shaft 25a outside an inner arc-shaped bearing plate 26 serving as an inner bearing means concentric with the horizontal curved path section 8. The support shafts 25a of the idler wheels 25 are arranged radially with respect to the arc center of the arc-shaped center line 8a. The circumferential interval between the respective idler wheels 25 is wider than the interval between the respective wheels 16, 17 of the outer driving wheel array 13. The outer arc-shaped bearing plate 18 supporting the outer driving wheel array 13 and the inner arc-shaped bearing plate 26 supporting the inner idler wheel array 14 are such that intermediate portions of the circumferential lengths thereof are attached on both inner and outer end portions of the frame 19 supporting the driving motor 15 and both end portions of the circumferential lengths are coupled and integrated with each other by coupling members 27a, 27b having an L-shaped cross section.

Figure 3:
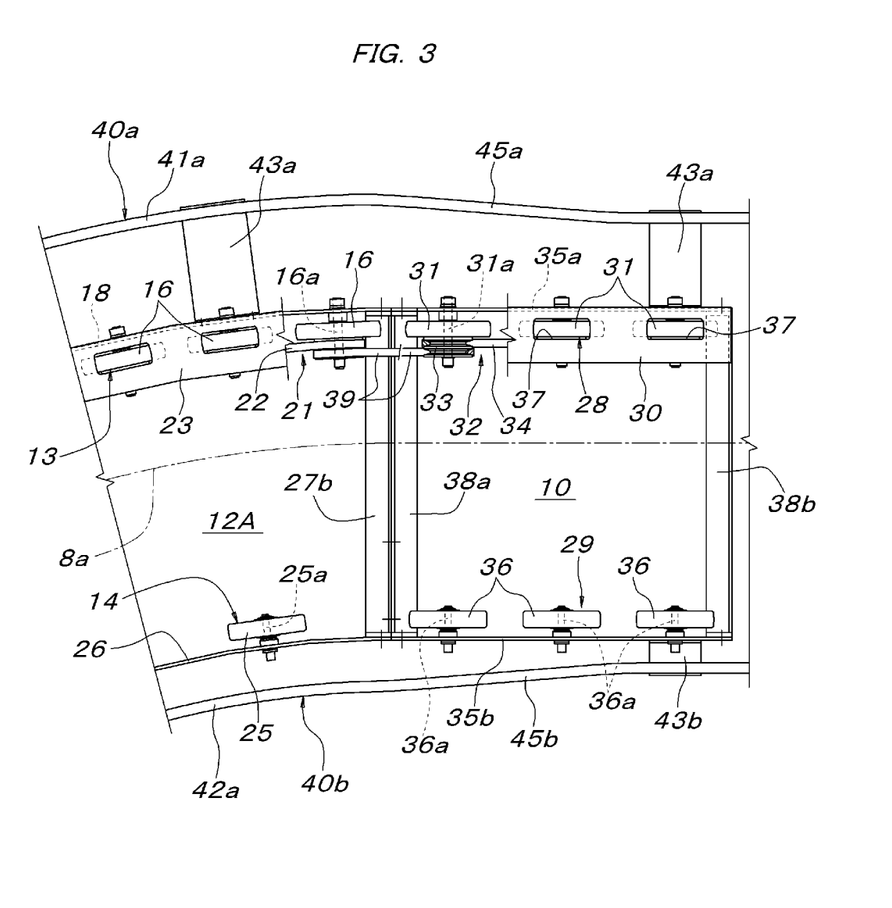
FIG. 3 is an enlarged partially cutaway plan view showing a part of FIG. 1.

The upstream side linear conveyor unit 10 and the downstream side linear conveyor unit 11 have the same structure, and as shown in the upstream side linear conveyor unit 10 shown in FIG. 3, include an outer driving wheel array 28, an inner idler wheel array 29, and a strip cover 30 covering the outer driving wheel array 28. The outer driving wheel array 28 is located at a position connecting to the outer driving wheel array 13 of the adjacent arc-shaped conveyor unit 12A, 12D, has driven wheels 31 supported by support shafts 31a in a cantilever manner inside an outer linear bearing plate 35a at the same interval as the driven wheels 16 of the outer driving wheel array 13, and includes a transmission means 32 interlockingly coupling the respective driven wheels 31 with one another. The transmission means 32 is composed of double pulleys 33 concentrically attached inside the respective driven wheels 31 and endless belts 34 stretched, in an inside and outside alternating manner, between the double pulleys 33 of adjacent driven wheels 31.

The inner idler wheel array 29 is located at a position connecting to the inner idler wheel array 14 of the adjacent arc-shaped conveyor unit 12A, 12D and has idler wheels 36 supported by support shafts 36a in a cantilever manner inside an inner linear bearing plate 35b at the same interval as the driven wheels 31 of the outer driving wheel array 28. The strip cover 30 covering the outer driving wheel array 28 corresponds to the strip cover 23 provided to the outer driving wheel array 13 which is made linear. The strip cover 30 includes rectangular openings 37 for making upper circumferential surface portions of respective driven wheels 31 upwardly project and covers the entire transmission means 32 interlockingly coupling the respective driven wheels 31. Both ends of the outer linear bearing plate 35a and both ends of the inner linear bearing plate 35b are coupled and integrated with each other by the same coupling members 38a, 38b as the coupling member 27a, 27b at both ends of each arc-shaped conveyor unit 12A to 12D.

The arc-shaped conveyor units 12A to 12D configured as above are arranged on the horizontal curved path section 8 so as to be continuous with each other in an arc shape, and vertical plate portions of the coupling members 27a, 27b adjacent to each other of the respective arc-shaped conveyor units 12A to 12D are overlapped with each other and coupled with a plurality of bolts and nuts to form the main body 9 of the curved conveyor 1 provided with the horizontal curved path section 8 extending over 180 degrees. To a beginning end side of the main body 9 of the curved conveyor 1, the upstream side linear conveyor unit 10 is connected, and to a terminal end side of the main body 9, the downstream side linear conveyor unit 11 is connected, and then the entire curved conveyor 1 is formed.

The connection between the main body 9 of the curved conveyor 1 and the upstream side linear conveyor unit 10 and the downstream side linear conveyor unit 11 will be described. The coupling member 27a at the beginning end side of the arc-shaped conveyor unit 12A located at the entrance of the horizontal curved path section 8 and the coupling member 38b at the terminal end side of the upstream side linear conveyor unit 10 are overlapped at the vertical plate portions and coupled with a plurality of bolts and nuts. As a result, the outer driving wheel array 13 of the arc-shaped conveyor unit 12A and the outer driving wheel array 28 of the upstream side linear conveyor unit 10 are connected, and the inner idler wheel array 14 of the arc-shaped conveyor unit 12A and the inner idler wheel array 29 of the upstream side linear conveyor unit 10 are connected. Since the upstream side linear conveyor unit 10 is not equipped with a motor for driving the driven wheels 31 of the outer driving wheel array 28, the driven wheel 16 located at the beginning end of the outer driving wheel array 13 in the arc-shaped conveyor unit 12A and having the double pulley 20 whose one pulley portion is vacant and the driven wheel 31 located at the terminal end of the outer driving wheel array 28 in the upstream side linear conveyor unit 10 and having the double pulley 33 whose one pulley portion is vacant are interlockingly coupled by stretching an endless belt 39 between the vacant pulley portions of the respective double pulleys 20, 33.

The connection between the terminal end of the arc-shaped conveyor unit 12D located at the exit of the horizontal curved path section 8 and the beginning end of the downstream side linear conveyor unit 11 and the interlocking coupling by the endless belt 39 between the driven wheels 16, 31 of respective outer driving wheel arrays 13, 28 are carried out in the same manner as described above. As shown in FIG. 2, the endless belts 22 in the transmission means 21 of the outer driving wheel arrays 13 of all of the arc-shaped conveyor units 12A to 12D are an even number (eight). Therefore, a state is brought about in which the double pulley 20 at the upstream side beginning end position and the double pulley 20 at the downstream side terminal end position have vacant pulley portions at inner and outer opposite positions. On the other hand, also in the upstream side linear conveyor unit 10 and the downstream side linear conveyor unit 11, as shown in FIG. 3, the endless belt 34 in the transmission means 32 of the outer driving wheel array 28 is an even number (two). Therefore, a state is brought about in which the double pulleys 33 at both ends have vacant pulley portions at inner and outer opposite positions. Therefore, the fact that the outer driving wheel array 13 of the arc-shaped conveyor unit 12A and the outer driving wheel array 28 of the upstream side linear conveyor unit 10 can be interlockingly coupled by the endless belts 39 as described above means that the outer driving wheel array 28 of the downstream side linear conveyor unit 11 corresponding to one having the same structure as the upstream side linear conveyor unit 10 but reversed 180 degrees and the outer driving wheel array 13 of the arc-shaped conveyor unit 12D can be interlockingly coupled to each other by the endless belt 39.

As shown in FIG. 1, a pair of inner and outer side guides 40a, 40b regulating the path width in the curved conveyor 1 are connected to the terminal ends of the pair of left and right linear side guides 7a, 7b provided to the upstream side straight path section 2 and the beginning ends of the pair of left and right linear side guides 7a, 7b provided to the downstream side straight path section 3. The pair of inner and outer side guides 40a, 40b are each composed of two side guide units 41a, 41b and 42a, 42b connected at the center position in the length direction of the horizontal curved path section 8, that is, at a connection place between the arc-shaped conveyor units 12B, 12C. The respective side guide units 41a to 42b are supported by the outer arc-shaped bearing plate 18 and the outer linear bearing plate 35a, and the inner arc-shaped bearing plate 26 and the inner linear bearing plate 35b via a plurality of brackets 43a, 43b and 44a, 44b, respectively. As shown in FIG. 4, of the side guides 40a, 40b, arc-shaped regions along the horizontal curved path section 8 are configured in concentric arc shapes that are the same distance apart to both left and right sides with respect to the arc-shaped center line 8a. A path width L1 between the side guides 40a, 40b at the horizontal curved path section 8 is configured to be wider than a path width L2 between the linear side guides 7a, 7b at the straight path section 2, 3 such that a vertically long rectangular tray T (shown by virtual lines in FIG. 1) having a length longer than the width in plan view can travel along the horizontal curved path section 8. Specifically, the path width L1 between the side guides 40a, 40b at the arc-shaped regions along the arc-shaped conveyor units 12A to 12D is set such that the center position in the length direction of the inner side of the tray T traveling along the horizontal curved path section 8 adjoins the inner side guide 40b and both front and rear end portions of the outer side of the tray T adjoin the outer side guide 40a.

Accordingly, of both inner and outer side guides 40a, 40b of the curved conveyor 1, the side guides 40a, 40b at the linear regions where the upstream side linear conveyor unit 10 and the downstream side linear conveyor unit 11 are arranged include inclined side guide portions 45a, 45b whose distance is gradually changed between end portions of the narrow path width connected to the linear side guides 7a, 7b regulating the path width of the straight path sections 2, 3 and end portions at the arc-shaped regions of the wide path width along the arc-shaped conveyor units 12A to 12D.

In the curved conveyor 1 of the present invention configured as above, a tray T which was conveyed by the linear belt conveyor units 4 of the upstream side straight path section 2 is sent into the upstream side linear conveyor unit 10 at the entrance side of the curved conveyor 1 and sent out to the downstream side straight path section 3 from the arc-shaped conveyor units 12A to 12D through the downstream side linear conveyor unit 11 by continuously operating the driving motor 15 of each arc-shaped conveyor unit 12A to 12D. The tray T driven to travel in the curved conveyor 1 is supported at the outer-side side by the rotationally driven wheels 31, 16, 31 of the outer driving wheel arrays 28, 13, 28 and the driving wheels 17 and supported at the inner-side side by the idler wheels 36, 25, 36 of the inner idler wheel arrays 29, 14, 29. The tray T travels on the horizontal curved path section 8 with the traveling posture regulated by both inner and outer side guides 40a, 40b.

The tray T traveling on the horizontal curved path section 8 travels forward by a thrust applied to the outer-side side from the rotationally driven driven wheels 16 of the outer driving wheel array 13 and the driving wheels 17. As shown in FIG. 4, a distance D1 between the outer driving wheel array 13 and the arc-shaped center line 8a on the horizontal curved path section 8 is narrower than a distance D2 between the inner idler wheel array 14 and the arc-shaped center line 8a. As a result, the distance by which the driven wheels 16 and the driving wheels 17 of the outer driving wheel arrays 13 drive the tray T along the horizontal curved path section 8 is increased as compared with the case where the position of the outer driving wheel array 13 is located at a bilaterally symmetrical position of the inner idler wheel array 14 with respect to a tray center line Ta passing through the center in the left-right width direction of the tray T. That is, the degree to which the traveling speed of the tray T on the horizontal curved path section 8 becomes lower than the traveling speed when the tray T travels the upstream side straight path section 2 can be suppressed. Accordingly, the interval in the traveling direction of the tray T at the upstream side straight path section 2 can be suppressed from being unreasonably narrowed at the time of traveling the horizontal curved path section 8.

When the upstream side linear conveyor unit 10 is not provided and the tray T is sent onto the arc-shaped conveyor unit 12A of the main body 9 of the curved conveyor 1 directly from the upstream side straight path section 2, even if the front half portion of the tray T enters the arc-shaped conveyor unit 12A and is influenced by the outer driving wheel array 13 along the horizontal curved path section 8, the rear half portion of the tray T is in a condition of receiving a large thrust in the straight-ahead direction from the linear belt conveyor unit 4 of the upstream side straight path section 2. Thus, the tray T cannot be smoothly turned to an orientation along the horizontal curved path section 8 and is pressed against the outer side guide 40a, and there is a possibility that the tray T is stopped in some cases. However, due to the existence of the upstream side linear conveyor unit 10, when the front half portion of the tray T enters the arc-shaped conveyor unit 12A, the rear half portion of the tray T is in a condition of receiving the thrust by the outer driving wheel array 28 at a position biased toward the center line of the upstream side linear conveyor unit 10, and the thrust is smaller than the thrust in the straight-ahead direction received from the linear belt conveyor unit 4 and the tray T tends to turn in the curving direction of the next arc-shaped conveyor unit 12A. Therefore, the disadvantage as described above is not caused. Further, due to the existence of the inclined side guide portions 45a, 45b at the beginning end side of the side guides 40a, 40b, there is no possibility of hindering the turning motion toward the curving direction of the arc-shaped conveyor unit 12A at the time the tray T is located at a position of straddling the upstream side linear conveyor unit 10 and the arc-shaped conveyor unit 12A.

The tray T which finished traveling on the horizontal curved path section 8 is sent out to the downstream side straight path section 3 after being turned to a substantially straight-ahead orientation by the downstream side linear conveyor unit 11. Thus, the tray T can be smoothly sent out to the downstream side straight path section 3 as compared with the case in which the front half portion of the tray T receives a large thrust in the straight-ahead direction from the linear belt conveyor unit 4 of the downstream side linear conveyor unit 11 under a condition in which the rear half portion of the tray T is still influenced by the outer driving wheel array 13 along the horizontal curved path section 8 of the arc-shaped conveyor unit 12D, that is, a condition in which the tray T is not turned to the straight-ahead orientation as in the case in which the downstream side linear conveyor unit 11 does not exist. Further, in this process, the tray T is corrected in its posture to the straight-ahead orientation from both left and right sides by the inclined side guide portions 45a, 45b at the terminal end side of the side guides 40a, 40b and also centering is performed. Also, in this regard, the tray T is smoothly sent out to the downstream side straight path section 3.

In the foregoing embodiment, the driving wheel 17 of the outer driving wheel array 13 of each arc-shaped conveyor unit 12A to 12D is directly attached to the output shaft of the driving motor 15 installed on the frame 19. However, according to conditions, as shown by virtual lines in FIG. 2, it is also possible that the driving wheel 17 is attached to an outer end portion of a driving shaft 46 supported so as to traverse the outer arc-shaped bearing plate 18 and the inner arc-shaped bearing plate 26, and a driving motor 47 whose output shaft is interlockingly coupled to an inner end of the driving shaft 46 can be installed outside the inner arc-shaped bearing plate 26 (on the side where the arc center of the horizontal curved path section 8 is located). Further, the outer arc-shaped bearing plate 18 pivotally supporting the driven wheels 16 on one side in a cantilever manner at appropriate intervals is used as the outer bearing means, and the inner arc-shaped bearing plate 26 pivotally supporting the idler wheels 25 in a cantilever manner at appropriate intervals is used as the inner bearing means. However, they should not be restricted to the configuration of the embodiment. For example, it is also possible that an outer bearing means or inner bearing means in which bearings independent along the horizontal curved path section 8 are installed on the base by the number of wheels is employed and each bearing pivotally supports the driven wheel 16 or the driving wheel 17, or the idler wheel 25. Further, even when the outer arc-shaped bearing plate 18 and the inner arc-shaped bearing plate 26 are used, these bearing plates may be those that strip plates are curved into an arc shape or bent into a polygonal shape. Also, in this case, the bearing plates can be configured by a single strip plate continuing over the entire length of the horizontal curved path section 8 or can be configured by being divided into a plurality of strip plates.

The curved conveyor of the present invention can be utilized as a tray conveyance means at a horizontal curved path section in a conveying path for mainly handling trays having a vertically long rectangular shape in plan view and having a fixed width and length.

What is claimed is:

1. A curved conveyor installed at a horizontal curved path section in a conveying path, comprises: an inner idler wheel array arranged along the horizontal curved path section on an inner side, where an arc center is located, with respect to an arc-shaped center line passing through a center of a path width of the horizontal curved path section and an outer driving wheel array arranged along the horizontal curved path section on an outer side, which is opposite to the side where the arc center is located, with respect to the arc-shaped center line, wherein a distance from the arc-shaped center line to the outer driving wheel array is configured to be shorter than a distance from the arc-shaped center line to the inner idler wheel array.

2. The curved conveyor according to claim 1, wherein the outer driving wheel array is composed of driven wheels pivotally supported at appropriate intervals by an outer bearing means provided along the horizontal curved path section, a driving wheel interlockingly coupled to a driving motor, and a transmission means interlockingly coupling the driven wheels and the driving wheel with one another, and the inner idler wheel array is composed of idler wheels pivotally supported at intervals wider than the wheel intervals of the outer driving wheel array by an inner bearing means provided along the horizontal curved path section, and both inner and outer side guides regulating a traveling path width of a conveyed object at the horizontal curved path section are provided bilaterally symmetrically with respect to the arc-shaped center line passing through the center of the path width of the horizontal curved path section.

3. The curved conveyor according to claim 1, wherein the outer driving wheel array is composed of the driven wheels pivotally supported, in a cantilever manner at appropriate intervals, by one side of an outer arc-shaped bearing plate provided along the horizontal curved path section, the driving wheel interlockingly coupled to the driving motor, and the transmission means interlockingly coupling the driven wheels and the driving wheel with one another, and a strip cover curved along the horizontal curved path section, having openings for making upper circumferential surface portions of the driven wheels and the driving wheel upwardly project, and covering the transmission means is supported by the outer arc-shaped bearing plate, and the inner idler wheel array is composed of the idler wheels pivotally supported, in a cantilever manner at intervals wider than the wheel intervals of the outer driving wheel array, by one side of an inner arc-shaped bearing plate provided along the horizontal curved path section, and the both inner and outer side guides regulating the traveling path width of the conveyed object at the horizontal curved path section are respectively supported by the both inner and outer arc-shaped bearing plates via brackets.

4. The curved conveyor according to claim 3, wherein the driving wheel of the outer driving wheel array is not pivotally supported by the outer arc-shaped bearing plate and is attached to an output shaft of the driving motor.

5. The curved conveyor according to claim 1, wherein the outer driving wheel array and the inner idler wheel array are divided into a plurality of fan-shaped regions whose circumferential length is an integral fraction of 90 degrees to form a plurality of arc-shaped conveyor units having the same structure, and the motor driving the wheels of the outer driving wheel array in each of the arc-shaped conveyor units is installed at each arc-shaped conveyor unit, and end portions of each arc-shaped conveyor unit are provided with coupling members coupling the end portions of adjacent conveyor units, and by connecting the plurality of arc-shaped conveyor units in the circumferential direction via the coupling members, the curved conveyor having a required circumferential length is formed.

6. The curved conveyor according to claim 1, wherein linear conveyor units each including a linear idler wheel array and a linear driving wheel array connected to the inner idler wheel array and the outer driving wheel array are arranged between the horizontal curved path section and straight path sections connected to the horizontal curved path section, and wheels of the driving wheel arrays of the linear conveyor units are interlockingly coupled to the wheels of the outer driving wheel array of the connected horizontal curved path section side.

7. The curved conveyor according to claim 2, wherein the both inner and outer side guides are bilaterally symmetrically extended with respect to the arc-shaped center line passing through the center of the path width of the horizontal curved path section so as to be wider than a path width of the straight path sections connected to the horizontal curved path section.

* * * * *